Aug. 13, 1940.  M. H. TUFT ET AL  2,210,990
PLANTER
Filed Feb. 23, 1937
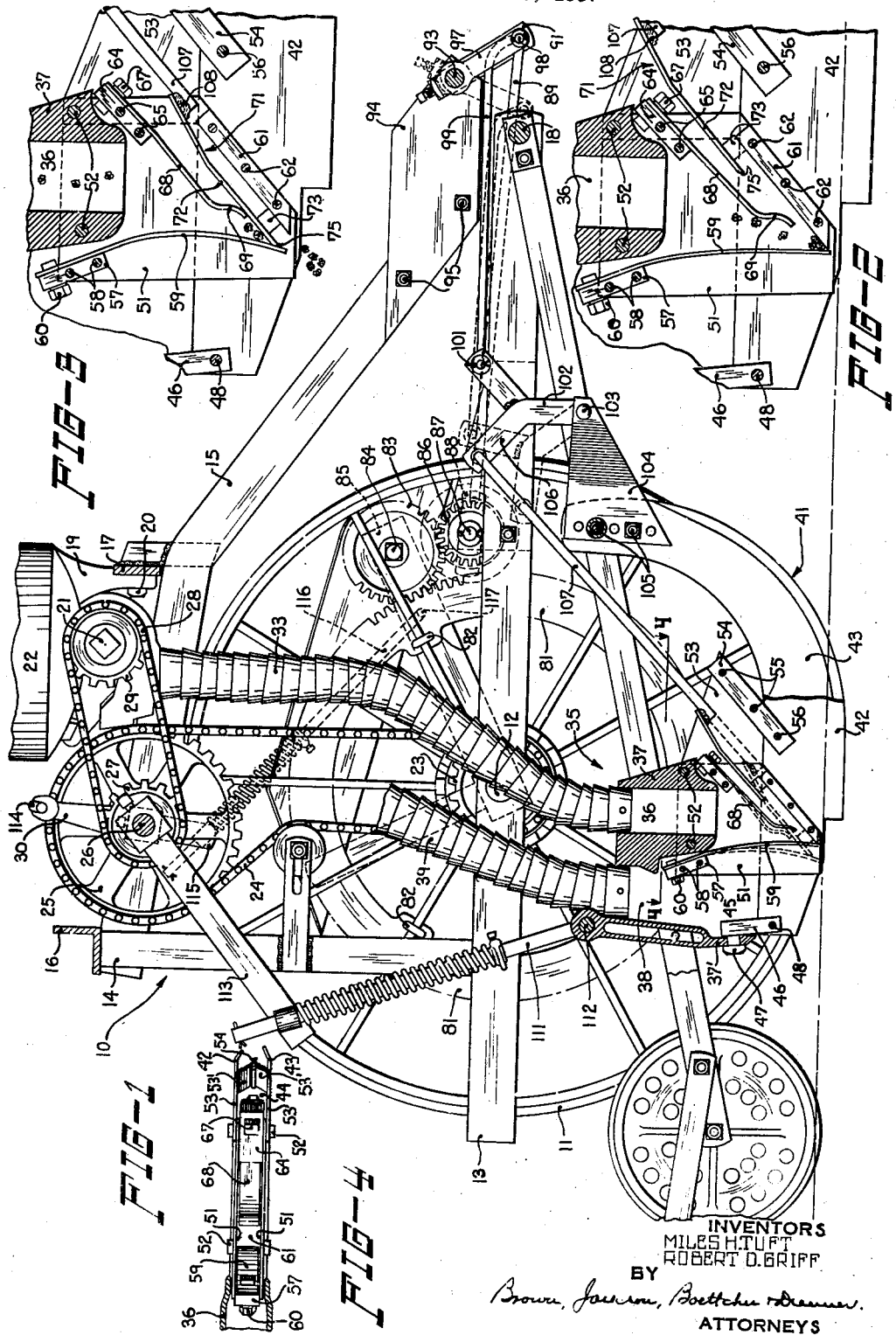
INVENTORS
MILES H. TUFT
ROBERT D. GRIFF
BY
Brown, Jackson, Boettcher & Dienner
ATTORNEYS Patented Aug. 13, 1940

2,210,990

UNITED STATES PATENT OFFICE 2,210,990

PLANTER

Miles H. Tuft, Moline, and Robert D. Griff, Rock Island, Ill., assignors to Deere & Company, Moline, Ill., a corporation of Illinois Application February 23, 1937, Serial No. 127,108

18 Claims. (Cl. 111—51)

The present invention relates generally to planters, and more particularly has to do with planters of the so-called hill drop type by which the seed is planted in hills at certain equally distant spaced points.

Heretofore, the planting of certain crops, such as beets, beans and the like, has been done by the drill method wherein the seeds are deposited in the seed bed or furrow in a continuous stream as the planter advances, resulting in a plant spacing of less than one inch. Since beets, for example, require a plant spacing of eight to ten inches in the rows in order to obtain the best results, it has been customary when planting by this method to thin out the rows by manually hoeing out the new plants that are in excess of the plants at the desired points in the row. This method of planting is undesirable, however, because of the large amount of seed that is wasted and because of the manual labor required to hoe out the excess plants.

While planters provided with hill drop mechanism which deposits a certain number of seeds at each predetermined point along a row have for many years been used in the planting of corn and are well known in the art, such planters, which usually are adapted to plant in spacings of about forty-two inches, have proved unsuccessful in planting beets and similar crops because they are not adaptable to the high speed required to plant in spacings of eight or ten inches at ground speeds of from 2½ to 4 miles per hour on account of the relatively high inertia of their reciprocating parts. In order to plant in spacings of eight or ten inches at ground speed of from 2½ to 4 miles per hour it is necessary that the valve mechanism be capable of five to ten actuations per second.

Another factor which is of importance in planting with hill drop mechanism is the rolling and scattering of the seed after it is discharged to the ground, and although it is relatively unimportant if the seed should roll two or three inches from the desired point when planting in forty-two inch spacings, this amount of scatter becomes serious when planting in relatively small spacings of eight or ten inches, particularly if the seed should roll in a longitudinal direction as that would destroy the proper spacing of the seeds in the row.

With the above in view it is the principal object of the present invention to provide a hill drop planting mechanism having reciprocating parts of simple and sturdy construction, few in number, of low inertia for high speed operation, and positive in function.

It is another object of the present invention to provide a valve mechanism for such planters which will operate to intercept a certain number of seeds at each actuation of said mechanism, will open the valve and will eject such intercepted seed, and in the ejecting operation will cut off the stream of seed from above so that only the desired number of seeds will be ejected at each predetermined point along the row.

It is a further object of the invention to provide a planting mechanism of this type which causes substantially no scattering or only a minimum scattering of the seed after it is discharged.

Other objects and advantageous features of the present invention will be apparent from the following description of the preferred embodiment of our invention taken in connection with the accompanying drawing, in which—

Figure 1 is a longitudinal vertical sectional view through a planter, our improved valve mechanism and the means for actuating the same being shown in side elevation;

Figure 2 is an enlarged fragmentary view of the valve mechanism shown in Figure 1 with the several parts of the valve in the positions they assume when the valve is closed, and showing a charge of seed in position in the valve before it is ejected;

Figure 3 is a view similar to Figure 2 but showing the parts of the valve in the position to which they are moved to eject the seed from the valve and to intercept and cut off the stream of seed dropping from above; and Figure 4 is a longitudinal horizontal sectional view taken substantially on the plane of the line 4—4 of Figure 1 showing the several parts of the valve.

Inasmuch as the present invention is not concerned with the type and the particular details of the construction of the planter in which our present improvements have been incorporated, it is not thought necessary to completely illustrate and describe the planter herein, and hence only such parts of the planter as are necessary to an understanding of the present invention have been shown in the drawing and will be hereinafter described. It is well to point out, however, that while Figure 1 shows mechanism for planting only one row, it is to be understood that the principles of the present invention may be applied to a planter having a plurality of planting units and adapted for planting any desired number of rows, as is usual in implements of this type.

The planter frame is indicated in its entirety by the reference numeral 10 and is supported on a pair of carrying wheels 11 disposed at opposite sides of the machine, each of said wheels being mounted on an axle 12 that is supported in any suitable manner between the legs of a relatively long longitudinally extending horizontally disposed U-shaped member 13 forming a part of the frame 10. Extending upwardly from each leg of each of the U-shaped frame members 13 near its rear end is a vertically extending frame member or bar 14. The frame 10 also includes a plurality of forwardly and downwardly disposed bars 15, the outer bars being secured in any suitable manner to the upper ends of the outer vertically extending bars 14, as shown in Figure 1, and extending forwardly and downwardly to a point adjacent the forward end of the outer legs of the U-shaped frame members 13. A rear transversely extending cross-bar 16 that is secured to the several vertically extending bars 14 in any suitable manner ties the rear and upper ends of all of the bars 14 and 15 rigidly together, and an intermediate transversely extending bar 17 secured in any suitable manner to each of the bars 15 ties all of the latter bars together adjacent the points where the bars 15 extend downwardly. The forward ends of the bars 13 and 15 are all rigidly held together in proper spaced relation by means of a tie rod or shaft 18.

The seed selecting and feeding devices (not shown) for each planting unit are carried within a suitable housing in the form of a casting 19 suitably supported on the intermediate transverse bar 17, as shown at 20, and such seed selecting and feeding devices are adapted to deliver the seeds in groups of two or three which follow each other relatively closely. The seeding shaft by which the several seed selecting mechanisms are driven is indicated by the numeral 21 and is suitably journaled in the casting 19. A seed hopper 22 is secured to the casting 19 in any approved manner. The seeding shaft 21 is driven by power from one of the supporting wheels 11 by mechanism that will now be briefly described. The supporting wheel 11 shown in Figure 1 has fixed thereto in any suitable manner a sprocket 23 around which is trained a drive chain 24 that is also trained around a large sprocket 25 journaled on a transverse lifting rock shaft 26 journaled in bearings provided therefor in the outer frame bars 15. A second sprocket 27 is journaled on the shaft 26 and a drive chain 28 is trained around said sprocket 27 and also around a sprocket 29 fixed in any suitable manner to the transverse seeding shaft 21. Suitable clutch mechanism (not shown) controlled by a lever 30 on the rock shaft 26 is provided between the sprockets 25 and 27 whereby the drive to the seeding shaft 21 may be disconnected when the implement is placed in transport position, as hereinafter described. Any other suitable means for interrupting the drive to the seeding shaft may, however, be provided.

Coming now to the lower valve mechanism with which the present invention is more particularly concerned, the seed delivered by the seed selecting and feeding devices is delivered into a flexible seed tube 33 which in turn delivers the seed to a lower valve unit indicated in its entirety by the reference numeral 35. The unit 35 includes a seed passageway 36 provided in a boot member or runner shank 37 in the form of a suitable hollow casting. The rear portion of the boot member 37, as indicated at 37', extends downwardly further than does the forward portion thereof and is provided with a suitable passageway 38 through which the fertilizer conveyed thereto through a flexible tube 39 from a hopper (not shown) is delivered to the seed bed.

The boot member 37 is supported upon the upper side of a runner or furrow opener 41 adjacent the rear end of the latter. The furrow opener 41 is formed of two members 42 and 43 spaced apart laterally at their rear portions to provide a chamber 44 (Figure 4) that communicates with a chamber 45 formed in the member 37 below the passageways 36 and 38. The forward ends of the members 42 and 43 of the furrow opener converge together and curve upwardly as shown, as is conventional in furrow openers of this type. Adjacent the rear wall of the fertilizer passageway 38 in the section 37' of the boot member 37 and extending between the side walls thereof is a block 46 which is secured to the member 37 by a bolt 47 or in any other suitable manner. The block 46 also extends downwardly below the member 37 between the side walls 42 and 43 of the runner 41, and a pin 48 extending through alined holes in said side walls and in the block 46 secures the runner 41 to the member 37.

A plate 51 is secured by bolts 52 to each side of the boot member 37, said bolts extending through alined openings provided therefor in the upper portions of the plates 51 and in the member 37 at either side of the seed passageway 36. As shown, the lower portion of each of the plates 51 extends down on the inside of its adjacent side wall 42 or 43 of the runner 41 as the case may be. A side plate 53 extends forwardly from each of the side plates 51, and as shown by dotted lines in Figures 2 and 3 the rear edge portion of each plate 53 overlaps the forward edge portion of the adjacent plate 51. The lower edge of each of the plates 53 rests on the upper edge of the adjacent side wall of the runner 41, and the plates 53 are held in position by the forward bolt 52. The two side plates 53 near their forward ends curve inwardly toward each other, as shown at 53' in Figure 4, and a vertically positioned plate 54 is secured between the forward ends of said inwardly curved portions 53' by a pair of pins or rivets 55 (see Figure 1). The plate 54 extends below the side plates 53, as shown in Figures 1 and 3, and such lower portion is secured to the two side walls 42 and 43 of the furrow opener 41 by a pin 56. This pin 56 acts to support the side plates 53 in addition to the support provided by the forward bolt 52 above mentioned. The inwardly curved side plates 53 prevent the entry of dirt or other foreign matter to the valve mechanism to be presently described that is disposed between the side plates 51.

Coming now to the valve mechanism proper, a block 57 is disposed in the fertilizer passageway 38 between the two side plates 51 and is fixedly held in position between said plates by means of bolts or pins 58 which pass through alined openings provided therefor in such side plates and block. A spring steel plate or valve member 59 is connected at its upper end to the block 57 by a bolt 60, and said plate normally extends downwardly and forwardly from said block to a point relatively close to the lower edges of the members 42 and 43 of the furrow opener 41, as best shown in Figure 2. The spring plate 59 is of such a width that it will just clear the inner surfaces of the side plates 51 so as to provide for its valve opening movement therebetween, and it is so positioned that it forms a continuation of the rear wall of the seed passageway 36. The front face of this spring plate 59 near its lower end normally abuts against the rear edge of a downwardly and rearwardly inclined stationary valve member or block 61 that extends between the side plates 51 and is fixedly secured therebetween by means of a plurality of bolts or rivets 62 that pass through alined openings in said side plates and block. The plate 59 and the block 61 form a V-shaped valve pocket into which the seed that are being constantly delivered by the seed feeding device through the seed passageway 36 in groups of two or three in rapid succession come to rest before they are ejected onto the ground by the ejecting member that will be hereinafter described. This V-shaped valve pocket is positioned relatively close to the bottom of the furrow and the purpose of so positioning it will later appear.

A block 64 is supported between the side plates 51 forward of the seed passageway 36, and said block is fixed in position by means of bolts or rivets 65 that extend through alined openings in the side plates and block. A spring steel plate 68 is fixedly connected at its upper end to the block 64 by means of a bolt 67 and extends downwardly and rearwardly from the block 64 substantially parallel to the block 61, and the block 64 has its rear end terminating a short distance forward of the spring plate 59. The spring plate 68 adjacent its rear end is provided with a downwardly curved portion 69, the purpose of which will hereinafter appear. An ejector 71 comprising a plate 72 having a steel block 73 secured in any suitable manner to the under side thereof near its rear end is adapted to be reciprocated back and forth by mechanism which will be hereinafter described, and in such movement the block 73 will slide on the upper surface of the block or stationary valve member 61 before described. The plate 72 and the block 73 are of such a width that they will just clear the inner surfaces of the side plates 51 in the reciprocation of the ejector so that no seed can pass between the side edges of the plate 72 and the side plates 51.

In Figure 2 we have shown the several parts of the valve in the positions they assume when the valve is closed and the ejector 71 is in retracted position; also one group of seeds is shown in the valve in position to be ejected while the next group of seeds is nearing such position. Upon reciprocation of the ejector 71 rearwardly to open the valve, the rear edge 75 of the ejector plate 72 strikes the spring plate 59 and flexes the lower end of said plate rearwardly out of contact with the rear edge of the block 61 into the position shown in Figure 3 and in such movement the block 73 of the ejector which slides on the block or stationary member 61 of the valve will eject the seed lying in the V-shaped pocket formed by the plate 59 and the block 61 into the seed bed with a rearward pushing motion. In the movement of the ejector 71 into valve opening position, the rear portion of the ejector will slide under the downwardly curved rear end 69 of the spring plate 68 and during the further movement into ejecting position the spring plate 68 will act to hold the ejector 71 in proper position with its block 73 in contact with the block 61 to thereby insure that the block will push out the seed. It will be remembered that the seed is being delivered by the seed feeding devices in groups of two or three which follow each other in rapid succession, and as the rear edge of the ejector plate 72 is in contact with the spring plate 59 when the valve is open such plate 72 acts to cut off the seed falling from above, so that such seed cannot pass through the open valve while the seed in the valve is being ejected therefrom below the ejector plate 72. This prevents any seed in addition to the desired number for each charge being dropped onto the seed bed upon opening of the valve. During the interval that the valve is open the seed from above will fall into the V-shaped pocket formed by the spring plate 59 and the ejector plate 72 as shown in Figure 3 which illustrates the open position of the valve. As the ejector plate 72 is again moved forwardly in its valve closing movement the spring plate 59 returns under its inherent spring force to the position shown in Figure 2, which is the closed position of the valve, and the rear edge of the ejector plate 72 remains in contact with the forward face of the spring plate 59 until such spring plate contacts with the rear edge of the block 61 to close the valve. As the rear edge of the ejector plate 72 moves out of contact with the spring plate 59 at the time that the spring plate 59 contacts with the block 61 to close the valve the next succeeding seeds being delivered will drop into the V-shaped pocket formed by the spring plate 59 and the block 61 and into position to be pushed out of the valve by the ejector block 73 upon the next valve opening actuation of the ejector 71. In the movement of the ejector to valve closing position, the rear edge of the spring plate 68 will act to brush off of the ejector plate 72 any seed intercepted by the plate 72 when the valve is open and that may cling to said plate 72, so that said seed will drop down into the V-shaped pocket formed by the stationary and flexible valve members 61 and 59, respectively, so as to be in position to be ejected on the next valve opening operation of the ejector 71. The curved portion 69 of the spring plate 68 also serves to guide or direct the falling seed toward the point of contact between the block 61 and the valve member 59, as best shown in Figure 2.

By providing the spring plate 59, engagement of said plate with the rear edge of the ejector plate 72 will always be maintained until the spring plate 59 returns to its normal position in contact with the rear edge of the block 61 upon actuation of the ejector 71 into valve closing position, and thus no seed will be permitted to pass through the valve and onto the seed bed in addition to the charge of seed being delivered to the seed bed by the valve. The operation of the seed feeding devices in feeding the seed in groups of two or three and the actuation of the ejector 71 are so timed with relation to each other that about two groups of seeds, or approximately five or six seeds, will be collected in the valve for each charge, as it has been found desirable, particularly in the planting of beets, that five or six seeds be planted in each hill not only to insure that there will always be at least one plant at each spacing, but also in case there is a crust on the surface of the earth through which one plant might not be able to break several plants acting together could break through easily. It will be understood, of course, that if desired the seed selecting means may discharge the seed in a continuous stream, one at a time, and the timing of the lower valve operation so adjusted that the desired number of seeds, usually five or six, will be delivered to the seed bed the proper distance apart in the rows, usually in the neighbourhood of eight inches. As the seed is ejected into relatively narrow trenches or furrows, the main tendency for the seed to roll is in a longitudinal direction or parallel to the line of advance of the implement, and this tendency has been practically overcome by ejecting the seeds from the valve at a point relatively close to the bottom of the furrow and so correlating the speed of reciprocation of the ejector 71 to the rate of forward advance of the machine that the seed when ejected will fall in practically a vertical line to the ground, with no forward or rearward component movement, and hence there is no tendency for the seed to roll after they hit the ground.

The means for actuating the ejector 71 will now be briefly described. As shown in Figure 1, a ring gear 81 is secured to the spokes of the driving supporting wheel 11 by means of eyebolts 82 or in any other appropriate manner. This ring gear meshes with a gear 83 mounted on a shaft 84 suitably supported at the outer end of an arm 85 that is journaled at its inner end on the axle 12 of the driving wheel. When the implement is in operating position for planting, the gear 83 is in mesh with a gear 86 fixed on one end of a shaft 87 suitably journaled on the frame, and the opposite end of the shaft has fixed thereon a crank member 88 that carries a crank pin. Pivotally connected to the crank pin is the rear end of a link 89 that has its forward end pivotally connected to the outer end of an arm 91. The inner end of the arm 91 is fixedly connected to a rock shaft 93 that extends transversely across the implement and is supported in brackets 94 secured, as by bolts 95, to the forwardly and downwardly extending frame members 15.

The rock shaft 93 carries a plurality of arms 97, one for each planting unit, and the outer end of each arm 97 is pivotally connected, as shown at 98, to one end of a link 99, the opposite end of which is pivotally connected to the upper end of one upper arm 101 of a Y-shaped lever 102 which is pivotally connected at its lower end, as shown at 103, to a bracket 104 fixedly secured by bolts 105 to the upper end of the furrow opener 41. The opposite arm 106 of the Y-shaped lever 102 has pivotally connected to its outer end the forward end of an operating rod or link 107 that at its rear end is welded, as shown at 108, or otherwise suitably fixed to the forward end of the ejecting member 71. In this connection it is well to point out that the ejector block 73 can never slip over the rear end of the member 61 because of misadjustment, due to the fact that the upper end of the member 61 acts as a stop for the lower or rear end of the link 107, as is apparent from an inspection of Figure 3. It is the standard practice in planters of this type to adjust the stroke of the ejector by setting the lower end of the link 107 against the upper end of the block 61 as a gauge for determining the extreme downward position of the ejector, thus eliminating the necessity for close inspection of the ejecting mechanism during adjustment. Attention is also called to the fact that by arranging the pivot points 98 and 101 of the reciprocating rod 99 of the ejector actuating mechanism in substantial alinement with the shaft 18 about which the planting mechanism swings as the runner 41 rides over stones and other obstructions the range of stroke of the ejector is unchanged by changes in elevation of the mechanism as it rides such obstructions, thereby eliminating any possibility of the ejector block 73 slipping over the upper end of the member 61.

In Figure 1 of the drawing the parts are shown in full lines in the positions they assume when the several parts of the valve are in closed position, and it will be seen, therefore, that by the mechanism just described when the gear 83 is in mesh with the gear 86 the rock shaft will be rocked when the driving wheel is rotated in the movement of the implement across a field, and that when the rock shaft 93 is rocked in a clockwise direction the several parts of the valve will be moved to their open position as shown in dotted lines in said figure. While we have described above the preferred means for actuating the ejector 71 it is to be understood that any other appropriate mechanism may be employed.

Means is provided for raising the furrow opener to inoperative or transport position, and such means includes the shaft 26 referred to above and a link member 111 for each of the planting units. Each link member 111 has its lower end pivotally connected, as shown at 112, to the boot member or casting 37 of the associated planting unit and its upper end pivotally connected in any suitable manner to the lower end of an arm 113 that is fixed at its upper end to the lifting rock shaft 26 before described and extends downwardly and rearwardly therefrom. An arm 114 is fixed to the shaft 26 and is connected with the clutch arm 30 so that when the rock shaft is actuated to raise the planting units the seeding drive clutch is disconnected. The rock shaft 26 may be operated in any suitable manner, as by power lift means or by a hand lever (not shown), whereby the operator may rock the countershaft 26 to raise and lower the furrow opener through the link 111 and arm 113, as will be readily understood.

It may also be desirable to disconnect the means for operating the valve actuating mechanism when the furrow opener is raised to transport position, and, therefore, mechanism has been provided for that purpose and will now be briefly described. An arm 115 suitably fixed to the outer end of the countershaft 26 and extending downwardly therefrom as shown has pivotally connected to its lower end the upper end of a link 116 that has its lower end pivotally connected, as shown at 117, to the arm 85 that carries the sprocket 83 as above described. By this construction when the shaft 26 is rocked to raise the lifting arms 113 for the several planting units, the link 116 will also function to move the arm 85 upwardly and rearwardly to disconnect the gear 83 carried by the arm out of engagement with the gear 86, as will be readily understood.

We claim:

1. A valve mechanism for planters comprising a stationary valve member, a movable valve member normally contacting said stationary member for closing the valve, a reciprocating member for moving said movable member out of contact with said stationary member to open the valve, and operating to eject the seed from the valve and resilient means resiliently engageable with the reciprocating member for brushing off of said reciprocating member any intercepted seed that may cling thereto.

2. A valve mechanism for planters comprising, in combination, a stationary valve member, a movable valve member normally contacting said stationary member for closing the valve, mechanism for moving said movable valve member away from said stationary member to open said valve and comprising means adapted to contact the seed in the valve to forcibly eject the seed from the valve and spring plate means for yieldingly holding said last mentioned means in contact with said stationary valve member and operating to brush off any intercepted seed that may cling thereto.

3. A valve mechanism for planters adapted to be connected to the runner shank of the planter comprising, in combination, a pair of plates adapted to be secured to opposite sides of said runner shank, a stationary valve member supported between said plates, a flexible valve member supported between said plates and normally contacting said stationary member for closing the valve, a reciprocating member movable along said stationary valve member for flexing said flexible valve member to open the valve, and spring means carried by said plates independent of said flexible valve member for holding said reciprocating member in contact with said stationary valve member when said reciprocating member is moved to valve opening position.

4. A valve mechanism for planters adapted to be connected to the runner shank of the planter comprising, in combination, a pair of plates adapted to be secured to opposite sides of said runner shank, a stationary valve member supported between said plates, a flexible valve member supported between said plates and normally contacting said stationary member for closing the valve, a reciprocating member movable along said stationary valve member for flexing said flexible member to open the valve, said reciprocating member comprising a plate member for closing the opening between said pair of plates above the seed retaining portion of the valve for intercepting the seed from above when the valve is opened and a block below said plate member to forcibly eject the seed therefrom, and means comprising a spring member carried by said plates and contacting with said plate member to brush from the latter any seed intercepted thereby while the valve is open.

5. A valve mechanism for planters comprising a stationary valve member, a movable valve member normally cooperating with said stationary valve member for closing the valve, a reciprocating member for moving said movable valve member to open the valve, said reciprocating member intercepting the seed when the valve is opened and operating to forcibly eject the seed from the valve, and a resilient member resiliently engageable with the reciprocating member and operating to brush off of said reciprocating member any intercepted seed that may cling thereto, the lower end of said resilient member being curved so as to direct seed toward the lower ends of said stationary and movable valve members.

6. A valve mechanism for planters comprising a stationary valve member, a movable valve member normally cooperating with said stationary valve member for closing the valve, a reciprocating member for moving said movable valve member to open the valve, said reciprocating member intercepting the seed when the valve is opened and having a portion engaging the stationary member and operating to forcibly eject the seed from the valve, and a spring member fixed at its upper end and having a downwardly curved portion at its lower end disposed adjacent said stationary valve member, the lower curved portion of said spring member acting resiliently against said reciprocating member for holding said portion against said stationary valve member and operating to brush off of the reciprocating member any intercepted seed that may cling thereto.

7. A valve mechanism for planters comprising a stationary valve member, a movable valve member normally cooperating with said stationary valve member for closing the valve, a reciprocating member for moving said movable valve member to open the valve, said reciprocating member intercepting the seed when the valve is opened and operating to forcibly eject the seed from the valve, and a spring plate anchored at one end and engaging said reciprocating member at the other end for holding said member against said stationary valve member and operating to brush off of the reciprocating member any intercepted seed that may cling thereto.

8. A valve mechanism for planters adapted to be connected to the runner shank of a planter comprising, in combination, a pair of plates adapted to be secured to opposite sides of said runner shank, a stationary valve member supported between said plates, a movable valve member supported between said plates and normally cooperating with said stationary member for closing the valve, a reciprocating member for moving said movable member out of contact with said stationary member to open the valve, said reciprocating member intercepting the seed when the valve is opened, and spring plate means for holding said reciprocating member in contact with said stationary valve member whereby said reciprocating member will contact the seed in the valve to forcibly eject the seed from the valve, said means operating to brush off of said reciprocating member any intercepted seed that may cling thereto.

9. A valve mechanism for planters adapted to be connected to the runner shank of a planter comprising, in combination, a pair of plates adapted to be secured to opposite sides of said runner shank, a stationary valve member supported between said plates, a movable valve member supported between said plates and normally cooperating with said stationary member for closing the valve, a reciprocating member for moving said movable member out of contact with said stationary member to open the valve, said reciprocating member comprising a plate for intercepting the seed when the valve is opened and a block secured to said plate for spacing said plate from said stationary valve member, said block contacting said stationary valve member when in valve opening position, and means for holding said block in contact with said stationary valve member whereby said block will contact the seed in the valve to forcibly eject the seed from the valve, said means operating to brush off of said plate any intercepted seed that may cling thereto.

10. A valve mechanism for planters adapted to be connected to the runner shank of a planter comprising, in combination, a pair of plates adapted to be secured to opposite sides of said runner shank, a stationary valve member supported between said plates, a movable valve member supported between said plates and normally cooperating with said stationary member for closing the valve, a reciprocating member for moving said movable member out of contact with said stationary member to open the valve, said reciprocating member intercepting the seed when the valve is opened, a block fixed between said pair of plates, and a spring member anchored at one end to said fixed block and engageable at the other end with said reciprocating member for holding the latter in contact with said stationary valve member.

11. A valve mechanism for planters adapted to be connected to the runner shank of a planter comprising, in combination, a pair of plates adapted to be secured to opposite sides of said runner shank, a stationary valve member supported between said plates, a movable valve member supported between said plates and normally cooperating with said stationary member for closing the valve, a reciprocating member for moving said movable member out of contact with said stationary member to open the valve, said reciprocating member intercepting the seed when the valve is opened, a block fixed between said pair of plates, and a spring member anchored at one end to said fixed block and engageable at the other end with said reciprocating member for holding the latter in contact with said stationary valve member, said other end of the spring member being formed to brush off of the reciprocating member any intercepted seed that may cling thereto.

12. A valve mechanism for planters adapted to be connected to the runner shank of a planter comprising, in combination, a pair of plates adapted to be secured to opposite sides of said runner shank, a stationary valve member supported between said plates, a fixed block supported between said plates, a spring member anchored at one end to said block and normally engaging said stationary member for closing the valve, a reciprocating member for flexing said spring member out of contact with said stationary member to open the valve, said reciprocating member intercepting the seed when the valve is opened, and means yieldingly engaging said reciprocating member for brushing off of the latter any intercepted seed that may cling thereto.

13. A valve mechanism for planters adapted to be connected to the runner shank of a planter comprising, in combination, a pair of plates adapted to be secured to opposite sides of said runner shank, a stationary valve member supported between said plates, a fixed block supported between said plates, a spring member anchored at one end to said block and normally engaging said stationary member for closing the valve, a reciprocating member for flexing said spring member out of contact with said stationary member to open the valve, said reciprocating member intercepting the seed when the valve is opened, a second fixed block supported between said plates, and a resilient plate anchored at one end to the second fixed block and engaging the reciprocating member at its other end for brushing off of the latter any intercepted seed that may cling thereto.

14. A valve mechanism for planters adapted to be connected to the runner shank of a planter comprising, in combination, a pair of plates adapted to be secured to opposite sides of said runner shank, a stationary valve member between said plates, a flexible valve member supported between said plates and normally contacting said stationary member for closing the valve, means for flexing said flexible valve member away from said stationary valve member to open said valve and comprising an operating member extending outwardly beyond one end of said plates, and means for closing the space between said plates below said operating member comprising a pair of plates having their inner ends secured to said first named plates and extending outwardly therefrom in parallel relation thereto, said last named pair of plates converging toward each other at their outer ends and being secured together.

15. A valve mechanism for planters adapted to be connected to the runner shank of a planter, comprising a seed boot casting, a pair of plates fixed to opposite sides of said casting and adapted to be secured to opposite sides of said runner shank, a stationary valve member supported between said plates underneath said casting, a movable valve member supported between said plates at one side of said casting and normally cooperating with said stationary member for closing the valve, a reciprocating member movable over said stationary valve member and acting to open said movable valve member, said reciprocating member intercepting the seed from said seed boot when the valve is opened, and means fastened to said plates at the side of said seed boot opposite to said movable valve member and acting against said reciprocating member for brushing off of the latter any intercepted seed that may cling thereto.

16. A valve mechanism for planters comprising, in combination, a stationary valve member, a flexible valve member normally contacting said stationary member for closing the valve, a reciprocating member movable along said stationary valve member for flexing said flexible member to open the valve, said reciprocating member comprising a plate member for closing the opening above the seed retaining portion of the valve for intercepting the seed from above when the valve is opened and a block below said plate member to forcibly eject the seed therefrom, and means comprising a spring member contacting with said plate member to brush from the latter any seed intercepted thereby while the valve is open.

17. A valve mechanism for planters, comprising a stationary valve member, a movable valve member normally contacting said stationary member for closing the valve, means slidable along said stationary valve member for shifting said movable member away from said stationary member and including means for forcibly ejecting the seed, and spring means disposed between said slidable means and said movable valve member, said spring means serving to prevent seed from engaging the portion of said slidable member that is spaced farthest away from said slidable member, and said spring means being engageable with said slidable means in its seed-ejecting position for holding it against said stationary member.

18. A valve mechanism for planters, comprising a stationary valve member upon which at least a portion of the seed to be planted are temporarily supported, a movable valve member normally contacting said stationary member for closing the valve and movable away from said stationary member a distance sufficient to be out of the way of the seed when the latter are ejected, and a reciprocable member slidable along said stationary member and including an abutment part having a seed engaging face disposed approximately perpendicular to the line of movement of said reciprocable member and engageable with the seed for forcibly ejecting the latter, said reciprocable member also including a part engageable with said movable valve member for moving it into a position where it is out of the path of movement of the seed.

MILES H. TUFT.
ROBERT D. GRIFF.